United States Patent Office 3,564,459
Patented Feb. 16, 1971

3,564,459
ATTENUATION SUPPORT DEVICE HAVING A SUBSTANTIALLY STEPLESS, EXPONENTIALLY VARYING TOTAL DAMPING RATE ALONG THE LONGITUDINAL LENGTH THEREOF
Helmuth Hahn, Munich, Germany, assignor to Siemens Aktiengesellschaft, Erlangen, Germany, a corporation of Germany
Filed Sept. 23, 1966, Ser. No. 581,473
Claims priority, application Germany, Sept. 29, 1965,
S 99,759
Int. Cl. H03h 7/30, 7/10
U.S. Cl. 333—30
11 Claims

ABSTRACT OF THE DISCLOSURE

This invention relates to an attenuation support device, for use with delay lines. In particular, this invention may be used to attenuate undesirable mechanical vibrations which may be transmitted to magnetostrictive elements comprising an electrical-mechanical transducer, or a mechanical-electrical transducer and prevent reflection of said vibrations back to the delay line. The attenuation or damping of these undesirable mechanical vibrations is achieved using minimum length attenuation strips associated with the attenuation support device.

---

In practicing this invention, a pair of magnetostrictive elements are mounted and supported by an attenuation link support. The support comprises three strips of silicate impregnated rubber, the silicate additive serving to increase the hardness of the rubber. Further, the manufacture of the attenuation strips involves a process to produce strips having successively greater silicate impregnations along the longitudinal length thereof, thereby having successively greater hardness characteristics. This, of course, produces an attenuation strip having an increasing damping or attenuating rate for the mechanical vibrations along the length thereof, the damping rate being proportional to the hardness. Further, the amount of silicate impregnation is varied so as to provide a substantially stepless exponentially varying total damping rate, thereby decreasing the possibility of reflection.

This invention also provides means to substantially increase the hardness, and hence the damping rate of the attenuation support device. Thus the ends of the magnetostrictive arms supported between the attenuation strips are spread apart so as to maximize the contact area between the magnetostrictive arms and the strips. Further, where said magnetostrictive arms are spread apart, as for example to form a V at the end thereof, foils of material relatively harder than said attenuating strips may be inserted between the magnetostrictive arms and the strips. This substantially increases the damping of the mechanical vibrations transmitted by the magnetostrictive elements, imparted as a result of the torsional vibrations in the delay line.

The entire attenuation link structure is securely mounted in such a manner as to inhibit sideway movement of the various elements, especially the relatively softer portions of the attenuation strip. In addition to transmitting the torsional vibrations imparted thereto by the magnetostrictive arms, the delay line may also comprise a conductor to transmit electrical impulses. Thus, the delay line simultaneously can transmit mechanical impulses in the form of torsional vibrations, as well as electrical impulses; this is particularly advantageous since transmission of intelligence impulses in two different energy forms inherently provides isolation therebetween.

The magnetostrictive transducer, in combination with the delay line provides a convenient delay line storage for use with various types of systems, such as telephony systems wherein ultrasonic delay line storage systems are employed. Further, the attenuation link support described, prevents the transmission of reflected vibrations, and thereby provides for accurate signals to be derived from the delay line. This is accomplished using attenuating strips of minimum length.

This invention further describes a process for manufacturing a plurality of said strips having similar damping characteristics along the longitudinal length thereof from a stack of layers of rubber, impregnated with different amounts of silicate additive. This is accomplished by vertically cutting strips from the stack.

PRIOR ART

In conventional delay line, devices, subjection of a pair of magnetostrictive arms to opposite magnetic fields imparts torsional vibrations to the delay line attached between the ends of the magnetostrictive arms. Thus, a mechanical torsional vibration is imparted to the delay line and is transmitted to a second pair of magnetostrictive members. Coils wound around the second pair of magnetostrictive elements, produce corresponding electrical impulses when subjected to a magnetic field, as the transmitted torsional vibrations impart translational motion to the second pair of magnetostrictive elements. The length of the delay line determines the time delay of the transmitted mechanical impulse.

The ends of the pairs of magnetostrictive arms must be supported, with the result that vibrations transmitted from the delay line to the ends of the magnetostrictive arms remote therefrom may be reflected at said ends and transmitted back to the delay line. Hence, it is necessary to provide attenuating means at the ends of the magnetostrictive arms not connected to the delay line to dampen such vibrations to a minimum level to prevent unwanted vibrations from being fed back to and transmitted by the delay line.

Thus, it is known to provide attenuation links fabricated of strips of material having high vibration damping rates, and to clamp the magnetostrictive arms therebetween. For example, strips of rubber may be utilized as the attenuation links to convert the mechanical vibrations present along the magnetostrictive arms to heat, through frictional engagement with said strips. However, the attenuation characteristics of rubber and other such materials is such that the desired attenuation of the vibrations requires long attenuating strips. Alternatively, the use of attenuating strips comprising materials having greater attenuating rates, such as, for example, silicate impregnated rubber, provides a relatively shorter attenuating strip length, but increases the possibility of the vibrations being reflected since the transition from the unattenuated zone to the attenuated zone of the magnetostrictive arms, is too sharp.

OBJECTS OF THE INVENTION

It is therefore an object of the invention to provide attenuating strips to suppress mechanical vibrations imparted to members mounted therebetween, wherein the damping rate increases along the length thereof, in a substantially stepless manner;

It is another object of the invention to ararnge the ends of the members within the attenuating zone, so as to maximize the contact area between the members and the attenuating strips;

It is another object of the invention to provide additional means to increase the damping rate at the end of the attenuating zone having the relatively highest damping rate, so as to minimize reflected vibrations, and simultaneously prevent reflection of the vibrations before reaching the end of the attenuating zone;

It is another object of the invention to provide a supporting structure for the attenuating strips and magnetostrictive arms which prevent sideway movement of the attenuating strips and the magnetostrictive arms, and especially of the softer portions of the attenuating strips;

It is still another object of the invention to provide a process for manufacturing attenuating strips having substantially stepless transitions between different hardness zones thereacross to decrease the possibility of reflections occurring at the transition points;

It is still another object of the invention to provide attenuating strips having exponentially increasing damping rates across the length thereof, to maximize the attenuation of mechanical vibrations that may be present in magnetostrictive elements mounted between successive attenuating strips of minimum length, and to simultaneously decrease the chances of reflection occurring at the transition points between zones of different damping rates.

DESCRIPTION OF THE INVENTION

Figure 1:
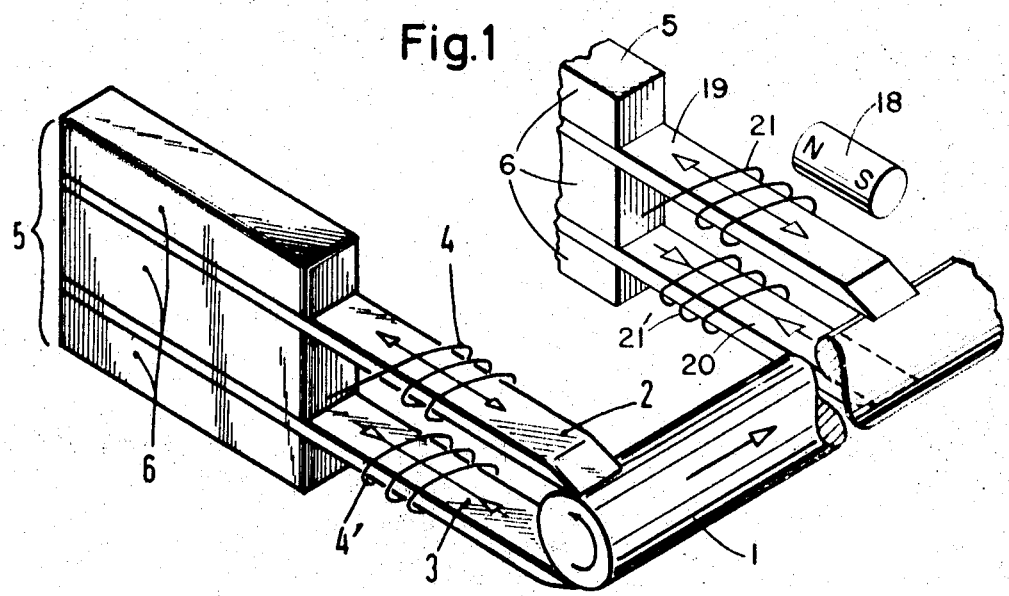
FIG. 1 is a perspective view of the attenuation link structure, which can be utilized simultaneously to support mechanical delay lines, and dampen reflections therefrom, thereby eliminating the transmission of unwanted mechanical vibrations.

FIG. 1 illustrates three silicate impregnated rubber strips, 6, with magnetostrictive arms 2 and 3 supported between alternate strips 6. Magnetostrictive arms 2 and 3 comprise positive magnetostrictive material; that is, the length of arms 2 and 3 varies proportionately with the magnetization to which they are subjected. Iron, for example, exhibits such properties.

Magnetostrictive arms 2 and 3 are subjected to magnetic fields of equal strength, but opposite magnetic polarity. Since arms 2 and 3 are similar, the result of the application of equal magnetic fields of opposite polarity, is to cause the arms to expand in opposite directions. Thus, in FIG. 1, the magnetic fields developed cause arm 3 to expand towards the right, whereas arm 2 simultaneously expands towards the left. This causes counterclockwise rotation of delay line 1, since arms 2 and 3 are fixedly secured thereto. Any mechanical means can be utilized to affix arms 2 and 3 to delay line 1; for example, welding or soldering.

If the polarities of the magnetic fields to which magnetostrictive arms 2 and 3 are subjected is reversed, magnetostrictive arm 2 will expand towards the right, and magnetostrictive arm 3 will expand towards the left. This in turn will cause clockwise rotation of delay line 1. Thus, the direction and degree of rotation of delay line 1, is determined by the amplitude and polarities of the magnetic fields to which magnetostrictive arms 2 and 3 are subjected.

Alternate methods of applying magnetic fields to magnetostrictive arms 2 and 3 may be used. Thus, electromagnetic fields may be created by winding coils 4 and 4' around magnetostrictive arms 2 and 3, respectively. If coils 4 and 4' are to be fed from the same source, they should be wound in opposite directions so as to provide fields of opposite magnetic polarity. Alternatively, permanent magnets may be utilized to effect magnetostrictive phenomena in arms 2 and 3. The twisting or rotation of delay line 1 is operative thereupon to impart a torsional vibration thereto. Depending upon the length of delay line 1, the mechanical vibration imparted thereto will be delayed a predetermined amount of time in passing down the line. Thus, the delay line may be utilized to store information for a predetermined period of time.

A similar attenuation link is provided at the other end of delay line 1 to convert the mechanical vibration impulses to electrical impulses. That is, the delay line will impart mechanical impulses to additional magnetostrictive arms 19 and 20 having coils 21 and 21' wound around them, in the presence of a magnetic field 18. This will cause electrical impulses proportional to said mechanical impulses to be induced in the coils, thereby converting the mechanical impulses translated by the delay line to electrical signals. These signals can be used to control various associated apparatus, such as telephony apparatus, wherein it is often desirable to use delay line storage systems. Magnetic field 18 may be produced, comprising either permanent magnet means or electromagnet means. Further, the delay line may comprise an electrical conductor in the form of a wire to which electrical signals may be fed for use by associated equipment. This enables the delay line to function as a dual conductor operative simultaneously to translate electrical signals and mechanical signals. The advantage in simultaneously translating signals in different energy forms over the same medium or conductor is that the respective signals are inherently isolated from each other.

The torsional vibrations developed in torsion wire or conductor 1 besides traveling down the delay line, may also be partially transmitted to the magnetostrictive arms of the attenuation support devices. When the vibrations imparted to the magnetostrictive arms reach the opposite ends thereof, they may be reflected back to the delay line along the magnetostrictive arms. These reflections are particularly undesirable, since unwanted mechanical impulses are thereby transmitted by the delay line. To prevent this, the vibrations imparted to the magnetostrictive arms as a result of the torsional vibrations developed in the delay line are attenuated so that undesirable reflections of said vibrations do not occur. Further, the means employed to attenuate these vibrations simultaneously provide support for the magnetostrictive arms.

Figure 2:
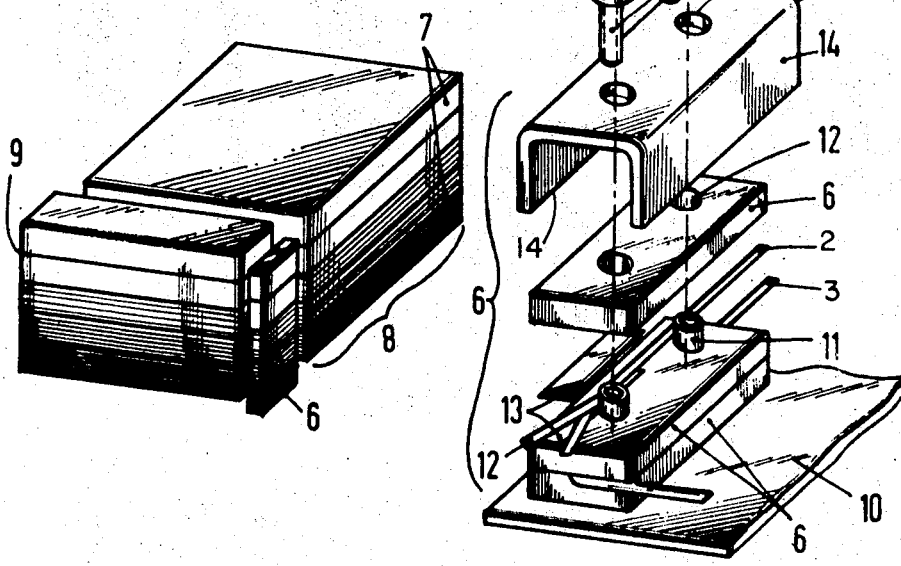
FIG. 2 is a perspective view of a block from which the strips comprising the attenuation link structure is manufactured, illustrating the composition of said block which comprises multiple silicate impregnated rubber layers.

FIG. 2 illustrates a method of manufacturing attenuation strips 6, having exponentially increasing mechanical damping rates along the longitudinal axis thereof. Thus, a plurality of layers 7 of silicate impregnated rubber are stacked as illustrated. The amount of silicate impregnated in each layer is varied, this being illustrated by the degree of shading for each layer illustrated in FIG. 2. The darker the shading, the greater the amount of silicate impregnated in each layer. Since the hardness of each layer is proportional to the amount of silicate impregnated therein, it is seen that the hardness of the stack increases from top to bottom of stack 8.

The individual layers 7 comprising stack or block 8 therefore basically comprise a material having good vibration dampening characteristics. Preferably, block 8 is initially comprised of several layers of molded cold vulcanized rubber with filler material preferably silicates, added in varying amounts to successive layers, the individual layers being held together as, for example, by cement. The block is then tempered. This varies the hardness and hence the vibration dampening characteristic of successive layers 7, proportionately to the amount of silicate added.

After the block has thus been processed, a bar 9 is cut therefrom, by cutting vertically through layers 7. Strips 6 may then be cut from any side of bar 9, as illustrated in FIG. 2. This ensures that all strips 6 utilized for the attenuation supports of a delay line system have similar hardness changes or characteristics in their longitudinal direction (FIG. 1), and thereby have similar vibration damping characteristics. Referring to FIG. 1, the ends of strips 6 nearest coils 4 and 4' comprise the softest ends of the strips, with the degree of hardness varying in the longitudinal direction of the strips. Thus, the amount by which the vibrations are dampened exponentially increases along the magnetostrictive arms, starting from the point of initial entry into the attenuation support. Therefore vibrations will not be reflected at the transition points between zones having different damping rates, since the transition is smooth.

Figure 3:
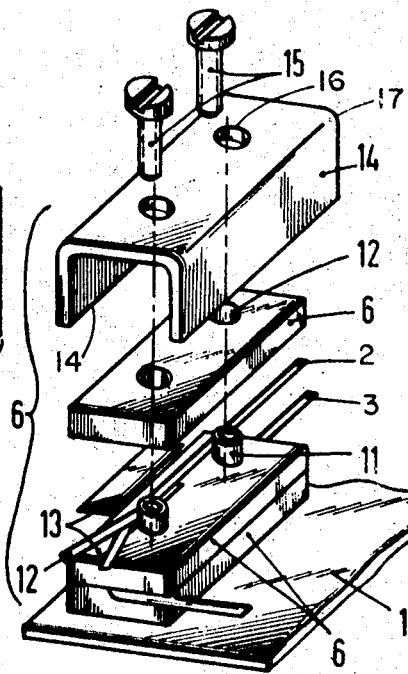
FIG. 3 is a perspective view of the disassembled attenuation link structure illustrating how the various elements comprising the link structure cooperate.

FIG. 3 illustrates the elements comprising the attenuation link support in disassembled form. Shafts 11 are mounted to base 10, and define internal threaded portions interfitting with the external threads of bolts 15. Strips 6 define holes 12 positioned relative to shafts 11, so that they are mountable thereover onto base 10. As illustrated, magnetostrictive arms 2 and 3 are mounted between and supported by successive strips 6.

To provide sufficient damping or attenuation to prevent unwanted reflected vibrations, magnetostrictive arms 2 and 3 are substantially narrower than strips 6. Further, the ends 12 of magnetostrictive arms 2 and 3 are spread apart to form a V-shape. This provides a shunt path for the reflected vibrations, the vibrations imparted to said magnetostrictive arms 2 and 3, and 19 and 20 from the torsional vibrations transmitted by the delay line thereby being divided between the paths forming the V. As a result, damping of the vibrations is substantially enhanced since they are subjected to a greater portion of attenuation strips 6. If necessary, foils 13 consisting of a material of relatively greater hardness than strips 6, may be inserted on each side of the magnetostrictive arms. This also increases the damping of the reflected vibrations. As illustrated in FIG. 3, foils 13, if used, are substantially coextensive with the length of the V ends of magnetostrictive arms 2 and 3. Thus, foils 13 are substantially shorter in length than strips 6. Vibrations transmitted from the delay line 1 along the magnetostrictive arms 2 and 3 are substantially dampened by the time they reach the portion of the damping zone wherein foils 13 are positioned. Thus there is slight chance that these vibrations will be reflected back by said foils along the magnetostrictive arms, because of the increased damping rate. The utilization of silicate impregnated rubber strips, together with magnetostrictive arms having V ends, and foils 13 of a material substantially harder than strips 6, substantially reduces the length of the attenuation strips normally necessary to dampen and reduce the reflected vibrations to an acceptable level.

To reduce the effect of eddy currents that may be induced in magnetostrictive arms 2 and 3, it may be desirable to use magnetostrictive arms comprised of laminae. If, for example, two laminae are used, the ends thereof should be spread away from each other and positioned so as to maximize the area of contact with strips 6.

As explained above, the silicate filler is added in such varying amounts as to provide substantially stepless, exponentially increasing damping rates along the length thereof. Thus, the vibrations imparted to magnetostrictive arms as a result of the torsional vibrations developed in delay line 1, first contact the relatively softer portions of strips 6, and are converted to heat by friction between the magnetostrictive arms and the adjoining attenuating strips 6. The area of the strips is sufficient to dissipate the heat thereby developed. After this initial damping, the vibrations present in the magnetostrictive arms contact the relatively harder portions of strips 6. Since they have been substantially dampened already, however, the transition to the area of increased damping effect is substantially smooth.

The entire structure illustrated in FIG. 3, is firmly clamped by U-clamp 17 defining holes 16 through which bolts 15 project for connection to shafts 11. Sides 14 of clamp 17 prevent sidewise movement of magnetostrictive elements 2 and 3, and particularly the softer sections comprising attenuating strips 6.

Thus, it is seen that this invention provides an attenuation link to simultaneously support the magnetostrictive arms of an electro-mechanical transducer, as well as attenuate unwanted reflections. This is achieved using materials of substantially shorter length than that previously used, and without having sharp or sudden changes in the damping rate of the attenuating strips. Further, means are disclosed whereby the damping rate can be substantially increased from one damping zone to another, without causing reflection of the vibrations at the boundary of the zones, to minimize the length of attenuating strips required to reduce reflected vibrations to a minimum.

Having thus described my invention, I claim the following:

1. An attenuation device to dampen mechanical vibrations comprising:
   two attenuating strips substantially abutting each other, each having first and second ends,
   a member partially supported tightly between said two attenuating strips, entering therebetween at the first ends thereof,
   said two attenuating strips comprising material capable of damping mechanical vibrations imparted to said member by frictionally converting the mechanical vibrations to heat, and having damping rates that gradually increase between the first and second ends.

2. The attenuation device to dampen mechanical vibrations described in claim 1 wherein the attenuating strips comprise silicate-impregnated rubber, the amount of silicate impregnation varying between the first and second ends of the strips.

3. The attenuation device to dampen mechanical vibrations as described in claim 2 wherein the amount of silicate impregnation varies between the first and second ends of said attenuating strips such as to exponentially increase hardness between the first and second ends.

4. The attenuation device to dampen mechanical vibrations as described in claim 1 wherein said material comprises a basic element and an additive to increase the hardness thereof, the amount of additive increasing between the first and second ends of the attenuating strips, the amount increasing gradually such as to provide damping rates that gradually increase between the first and second ends of the attenuating strips.

5. An attenuation link support for a magnetostrictive transducer having first and second magnetostrictive arms attached to opposite peripheral surfaces of a delay line, the magnetostrictive arms being subjected to magnetic fields of opposite polarity to effect changes in the length of the first and second magnetostrictive arms to twist said delay line and thereby impart torsional mechanical vibrations thereto comprising:
   first, second, and third successive attenuating strips, successive attenuating strips substantially abutting each other, each having first and second ends,
   a portion of said first and second magnetostrictive arms supported between the first and second, and second and third attenuating strips, respectively,
   said attenuating strips comprising material capable of damping any mechanical vibrations imparted to the first and second magnetostrictive arms as a result of torsional vibrations in the delay line, by frictionally converting the mechanical vibrations to heat, said first, second, and third attenuating strips having damping rates that gradually increase between the first and second ends.

6. The attenuation link support described in claim 5 wherein said first, second, and third attenuating strips comprise silicate-impregnated rubber, the amount of silicate impregnation varying between the first and second ends of the first, second, and third attenuating strips.

7. The attenuation link support described in claim 6, wherein the amount of silicate impregnation varies between the first and second ends of said first, second and third attenuation strips such as to exponentially vary the hardness between the first and second ends.

8. The attenuation link support described in claim 5 wherein:

the ends of the first and second magnetostrictive arms supported between the first and second, and second and third attenuation strips, are spread apart to form a V, thereby maximizing the contact area between said first and second magnetostrictive arms, and said first and second, and second and third attenuating strips, respectively.

9. The attenuation link support described in claim 8, further comprising:

foils comprising material having a greater relative hardness than said first, second, and third attenuation strips which are inserted between the first magnetostrictive arm and the first and second attenuating strips, and between the second magnetostrictive arm and the second and third attenuating strips, coextensive with the V portion of the first and second magnetostrictive arms, to increase the damping rate along the V portion.

10. The attenuation link support described in claim 5, further comprising:
a base,
a U-shaped clamping means,
the combination of said first, second, and third attenuation strips, and said first and second magnetostrictive arms securely clamped by said U-shaped clamping means to said base.

11. A process for manufacturing a plurality of silicate-impregnated rubber strips having similar and increasing hardness characteristics comprising:

stacking and cementing together a plurality of layers of silicate-impregnated rubber having successively greater proportions of silicate impregnation therein, tempering the stack,
cutting a bar from said stack across said plurality of layers, thereafter,
slicing strips from said bar across said plurality of layers thereby providing a plurality of strips having similar hardness characteristics along the length thereof.

References Cited

UNITED STATES PATENTS 2,718,637   9/1955   Goodwin.
3,011,136   11/1961   Scarrott.

HERMAN KARL SAALBACH, Primary Examiner

T. VEZEAU, Assistant Examiner

U.S. Cl. X.R.

333—71, 81; 156—250; 181—0.5